May 21, 1929.   W. D. FLETCHER   1,713,649
APPARATUS FOR GENERATING ELECTRIC ENERGY
Filed Sept. 17, 1926
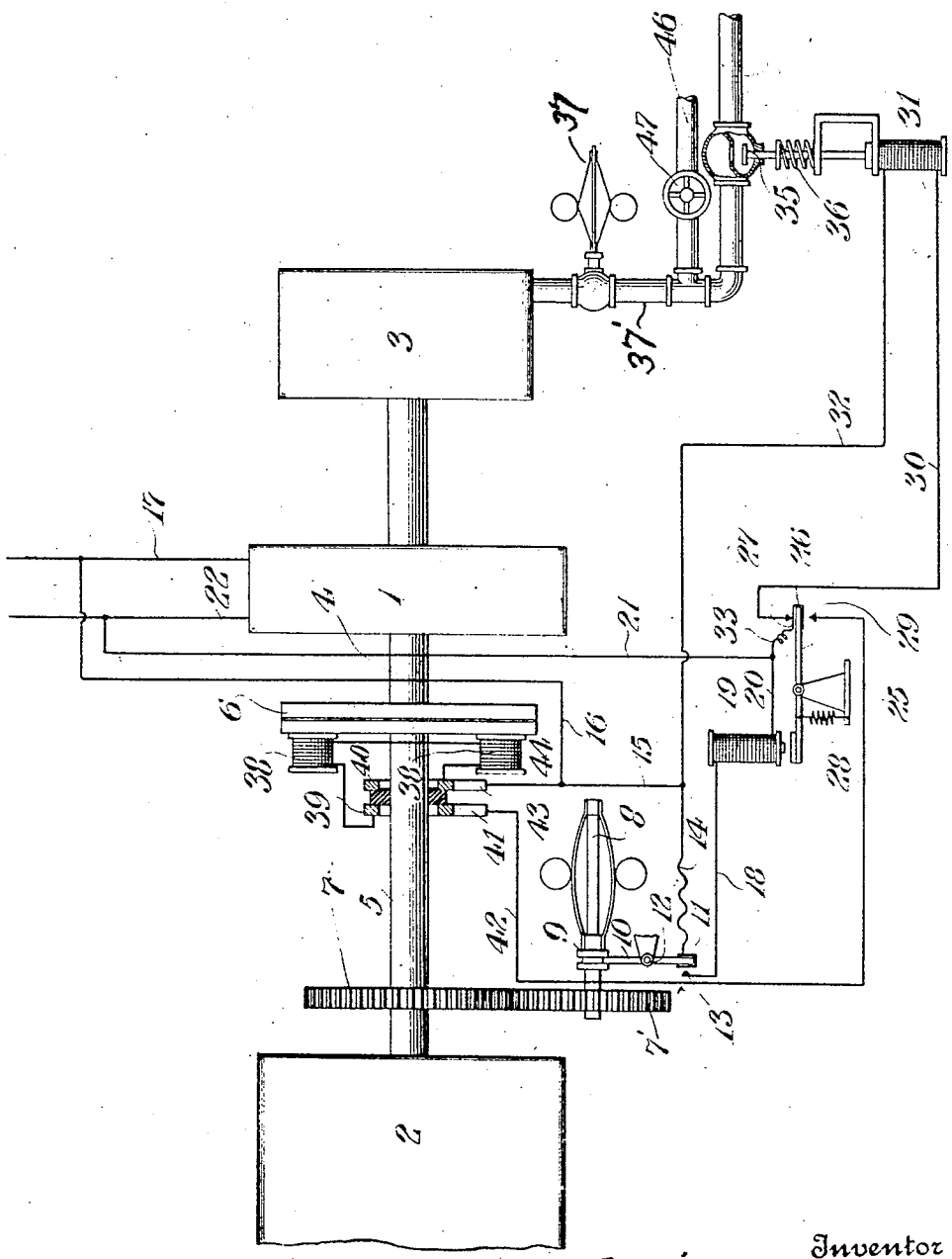

Patented May 21, 1929.

1,713,649

UNITED STATES PATENT OFFICE.

WILLIAM D. FLETCHER, OF WEST NEW BRIGHTON, NEW YORK.

APPARATUS FOR GENERATING ELECTRIC ENERGY.

Application filed September 17, 1926. Serial No. 136,020.

This invention relates to the generation of electric power for operating machinery or equipment which is auxiliary or incidental to the operation of a main engine and to apparatus adapted for this purpose.

It is an object of this invention to provide means by which such power may be generated more economically than is possible at present.

Other objects and advantages of the invention will appear hereinafter.

A preferred embodiment of the invention selected for purposes of illustration is shown in the accompanying drawings, in which—

The figure is a semi-diagrammatic view of the apparatus.

As a specific example of the application of the invention, the power plant of a steamship may be considered. In such ships, a main engine of any desired type is provided which drives suitable propelling mechanism either directly or through reduction gearing or in some cases through suitable electrical mechanism. Auxiliary equipment incidental to the operation of the main engine is also provided, consisting usually of pumps and blowers, as for example, the main condenser circulating pump, condenser air pump, boiler feed pump, fuel oil pumps, lubricating oil pumps, fuel oil transfer pumps and draft blowers. Other auxiliary equipment is also frequently provided as, for example, ventilating equipment, lighting and heating equipment, bilge pumps, ballast pumps, and sanitary pumps. It has been found convenient to operate such auxiliary equipment by electricity and accordingly, in many ships, an electric generator is provided, driven by an auxiliary engine, which generates the electric power necessary to operate said auxiliary equipment.

Since the smaller auxiliary engine is relatively inefficient as compared with the main engine, the operating cost of such installations is relatively high. If it were possible to drive the auxiliary generator at all times from the main engine, it is apparent that more economical operation would result, but inasmuch as the speed of the main engine varies from time to time and also since the main engine is stopped completely for long and short intervals during which the auxiliary equipment must be operated continuously, this is impractical. Therefore, according to the preferred embodiment of the invention, as a means of reducing operating costs, it is proposed to take power for the generation of current for the auxiliaries from the main engine so long as said engine is operating at or above a predetermined rate of speed, but to provide an auxiliary engine from which power for the generation of current may be taken when the main engine falls below said predetermined rate of speed or when it is stopped.

The principle of the invention may be applied in many different ways, but for purposes of illustration has been shown as applied to an apparatus in which a single generator 1 is driven either by the main engine 2 or by an auxiliary engine 3. In the embodiment illustrated, the generator shaft 4 is connected to a shaft 5 which is driven by the main engine, through a clutch 6 which will be described more particularly hereinafter. The auxiliary engine 3 is connected to the other end of the generator shaft 4 and is kept up to speed at all times by operation of the main engine in order that it may always be in condition to take over the driving of the generator.

Connected to the shaft 5 is a gear 7 which meshes with a gear 7' to drive the ball governor 8. Movement of the collar 9 as the governor is driven at different speeds causes movement of the lever 10 carrying the electrical contact 11. This lever is pivoted at 12 in such manner that when the main engine is stopped or is operating at less than a predetermined speed, contact 11 is separated from the contact 13 arranged adjacent thereto in the manner illustrated. As the speed of the main engine increases, contact 11 is moved to contact with the contact 13. Contact 11 is connected by means of leads 14, 15 and 16 to the lead 17 from the generator and contact 13 is connected through the lead 18, electro-magnet 19, leads 20 and 21 to the lead 22 from the generator. Consequently, whenever the contact 11 contacts with the contact 13 a circuit is made which energizes the electro-magnet 19 to operate the switch 25. Switch 25 carries a contact 26 which is normally held in contact with the contact 27 by means of the spring 28, but when operated by the electro-magnet 19 the contact 26 is moved to contact with the contact 29.

Contact 27 is connected through lead 30, electro-magnet 31 and lead 32 to the lead 15 and thence through leads 16 to the lead 17 from the generator and contact 26 is connected through the lead 33 to lead 21 which is connected to the lead 22 from the generator. Consequently, when the switch 25 is in the position illustrated and contact 26 is in contact with contact 27 a circuit is formed which energizes the electro-magnet 31 to open the steam valve 35 against the tension of the spring 36 to supply steam to the auxiliary engine 3. When the switch 25 is operated to break the contact 27, however, magnet 31 is de-energized and the steam valve 35 closes under the influence of the spring 36.

The clutch 6 illustrated is of the magnetic type and carries a plurality of electro-magnets 38 connected in series and having a suitable electrical connection to the rings 39 and 40 carried on the shaft 5. Ring 39 is connected through the fixed contact member 41 and lead 42 to the contact 29 and ring 40 is connected through the contact member 43 and lead 44 to the leads 15 and 16. Thus, when the apparatus is in the position illustrated in the drawing, the clutch faces are disengaged but when the switch 25 moves to make the contact 29 a circuit is formed which energizes the electro-magnets 38 which causes the clutch faces to engage.

The operation of the apparatus will be apparent from the foregoing description. When the main engine is stopped or is operating below the predetermined speed the clutch 6 is disengaged and electro-magnet 31 is energized to open the steam valve 35 to drive the auxiliary engine 3. Admission of steam to the auxiliary engine 3 is controlled by the governor 37 which may control a valve in the steam line 37' in the ordinary manner to cause the auxiliary engine to be driven at substantially constant speed under varying loads. Whenever the main engine comes up to speed, lever 10 is operated by the governor 8 to make the contact 13 which operates the switch 25. Operation of the switch 25 de-energizes the magnet 31 to permit the steam valve 35 to close and at the same time completes the circuit containing the electro-magnets 38 to engage the clutch 6 thus permitting the generator to be driven from the main engine. If desired, the by-pass steam line 46 may be provided controlled by a valve 47 which may be used to start the auxiliary engine, if, for any reason, the automatic mechanism should fail to operate. The valve 47 may remain partly open at all times, if desired, to permit steam to enter the auxiliary engine to cool the same or to cause said auxiliary engine to take part of the driving load from the main engine.

While in the preferred embodiment illustrated the invention has been shown as applied to apparatus in which a single generator is driven either by the main engine or by an auxiliary engine, it will be apparent that the principle of the invention may be applied to apparatus in which two generators are provided, one being driven by the main engine and the other being driven by an auxiliary engine at times when the main engine generator fails to produce the necessary current, the automatic means being employed in this case, as in the case of the apparatus particularly described, to shift the load from the main engine to the auxiliary engine and vice versa.

It will also be understood that the invention may be variously modified and embodied within the scope of the subjoined claims.

I claim as my invention:

1. In an apparatus for generating current for the operation of equipment auxiliary or incidental to the operation of a main engine, a generator, means including a clutch to operatively connect said generator to said main engine, an auxiliary engine, means to operatively connect said generator to said auxiliary engine, a steam valve for controlling the application of steam to drive said auxiliary engine, and means controlled by said main engine for disengaging said clutch and for opening said steam valve when said main engine falls below a predetermined speed.

2. In an apparatus for generating current for the operation of equipment auxiliary or incidental to the operation of a main turbine, a generator, means to operatively connect said generator to said main turbine, an auxiliary turbine, means to operatively connect said generator to said auxiliary turbine, a throttle valve to control said auxiliary turbine, and clutch controlled mechanical means to disconnect said generator from said main turbine and to open said throttle valve when said main turbine falls below a predetermined speed.

3. In an apparatus for generating current for the operation of equipment auxiliary or incidental to the operation of a main engine, clutch controlled mechanical means for taking power for the generation of current from the main engine when said engine is operating at or above a predetermined speed, an auxiliary steam engine, means for taking power for the generation of current from said auxiliary steam engine when said main engine is stopped or is operating below said predetermined speed, and automatic means controlled by said main engine for shifting the load from the main to the auxiliary engine and vice versa and for admitting motive fluid to the auxiliary engine.

4. In an apparatus for generating current for the operation of equipment auxiliary or incidental to the operation of a main engine, generator means, clutch controlled mechanical means for driving said generator means from the main engine when said engine is operating at or above a predetermined speed, an auxiliary engine permanently connected to said generator and moving therewith at all times, and automatic means controlled by said main engine for shifting the load from the main to the auxiliary engine and vice versa and for admitting motive fluid to the auxiliary engine.

5. In an apparatus for generating electric current for the operation of equipment auxiliary or incidental to the operation of a main engine, a continuously-operating generating means, an auxiliary engine permanently attached thereto and moving therewith at all times, a clutch controlled mechanical connection for driving said generating means and said auxiliary engine from the main engine when said engine is operating at or above a predetermined speed, and automatic means to cause said auxiliary engine to drive said generating means when the main engine is stopped or is operating at less than said predetermined speed.

6. In an apparatus for generating current for the operation of equipment auxiliary or incidental to the operation of a main engine, generating means, clutch controlled mechanical connecting means for driving said generator means from the main engine when said engine is operated at or above a predetermined speed, an auxiliary engine permanently attached to said generator means and moving therewith at all times, and means for supplying motive fluid to said auxiliary engine when said main engine is stopped or is operating below said predetermined speed.

7. In an apparatus for generating current for the operation of equipment auxiliary or incidental to the operation of a main engine, a generator, means including a clutch to connect said generator to said main engine, an auxiliary engine permanently secured to said generator and moving therewith at all times, and means controlled by said main engine for disengaging said clutch when said main engine falls below a predetermined speed.

8. In an apparatus of the class described, a main engine, a continuously operating driven means, an auxiliary engine permanently attached thereto and moving therewith at all times, a clutch controlled mechanical connection for driving said driven means and said auxiliary engine from the main engine when said engine is operating at or above a predetermined speed, and automatic means to cause said auxiliary engine to drive said driven means when the main engine is stopped or is operating at less than said predetermined speed.

9. In an apparatus of the class described, a driven member and means for driving said driven member at a constant speed comprising a variable speed prime mover and a constant speed prime mover, a clutch controlled mechanical connection for engaging and disengaging said variable speed prime mover from said driven member when the speed thereof falls below a predetermined limit, and means to govern the admission of motive fluid to said constant speed prime mover to cause the same to be driven at constant speed under varying loads.

10. In an apparatus of the class described, a main engine, a continuously operating driven means, an auxiliary engine permanently attached thereto and moving therewith at all times, a clutch controlled mechanical connection, means for taking power for driving said driven means from the main engine when said engine is operating at or above a predetermined speed, and means for admitting motive fluid to said auxiliary engine while taking power from said main engine.

In testimony whereof, I have signed my name to this specification this 15th day of September, 1926.

WILLIAM D. FLETCHER.